(12) United States Patent
Tucker

(10) Patent No.: US 7,032,474 B2
(45) Date of Patent: Apr. 25, 2006

(54) MECHANICAL ATTACHMENT FOR A SHIFT LEVER VIBRATION ISOLATOR

(75) Inventor: Brian R. Tucker, Sterling Heights, MI (US)

(73) Assignee: General Motors Corporation, Detroit, MI (US)

(*) Notice: Subject to any disclaimer, the term of this patent is extended or adjusted under 35 U.S.C. 154(b) by 403 days.

(21) Appl. No.: 10/465,187

(22) Filed: Jun. 19, 2003

(65) Prior Publication Data

US 2004/0255710 A1    Dec. 23, 2004

(51) Int. Cl.
*B60K 20/00* (2006.01)
*G05G 5/00* (2006.01)
*G05G 1/04* (2006.01)

(52) U.S. Cl. ............... 74/473.29; 74/469; 74/523; 74/543; 74/473.1; 403/221; 403/225

(58) Field of Classification Search ............ 74/473.29, 74/469, 470, 473.1, 473.15, 523, 543; 403/225, 403/226, 228, 221
See application file for complete search history.

(56) References Cited

U.S. PATENT DOCUMENTS

| | | | | |
|---|---|---|---|---|
| 3,800,909 A | * | 4/1974 | Duncanson et al. | 181/207 |
| 4,492,129 A | * | 1/1985 | Hasegawa | 74/473.29 |
| 4,569,246 A | * | 2/1986 | Katayama et al. | 74/473.29 |
| 4,603,598 A | * | 8/1986 | Tsuji et al. | 74/473.34 |
| 4,606,238 A | * | 8/1986 | Ikemoto et al. | 74/473.29 |
| 4,711,135 A | * | 12/1987 | Horiuchi et al. | 74/473.29 |
| 5,467,664 A | | 11/1995 | Wehner | 74/523 |
| 6,212,971 B1 | * | 4/2001 | Rucinski et al. | 74/523 |
| 6,513,406 B1 | * | 2/2003 | Murray et al. | 74/523 |

OTHER PUBLICATIONS

U.S. Appl. No. 10/405,323, filed Apr. 2, 2003.

* cited by examiner

*Primary Examiner*—Richard W. Ridley
*Assistant Examiner*—Colby Hansen
(74) *Attorney, Agent, or Firm*—Laura C. Hargitt

(57) ABSTRACT

A mechanical attachment for a two-stage, bi-directional shift lever vibration isolator. A shift lever has a sleeve which receives thereinside a lever vibration isolator which includes a damping body having an outer surface characterized by an hour-glass cross-section; an attachment housing within the damping body; and upper and lower washers connected to the housing. An attachment bore passes laterally through the housing and is lined by a layer of the damping body. The attachment bore is disposed in the center of recessed surfaces of the hour-glass cross-section. An attachment pin passes through the attachment bore and the sleeve. The shift lever vibration isolator is freely slidable on the attachment pin, facilitated by a clearance between the attachment pin and the bore lining layer.

16 Claims, 2 Drawing Sheets

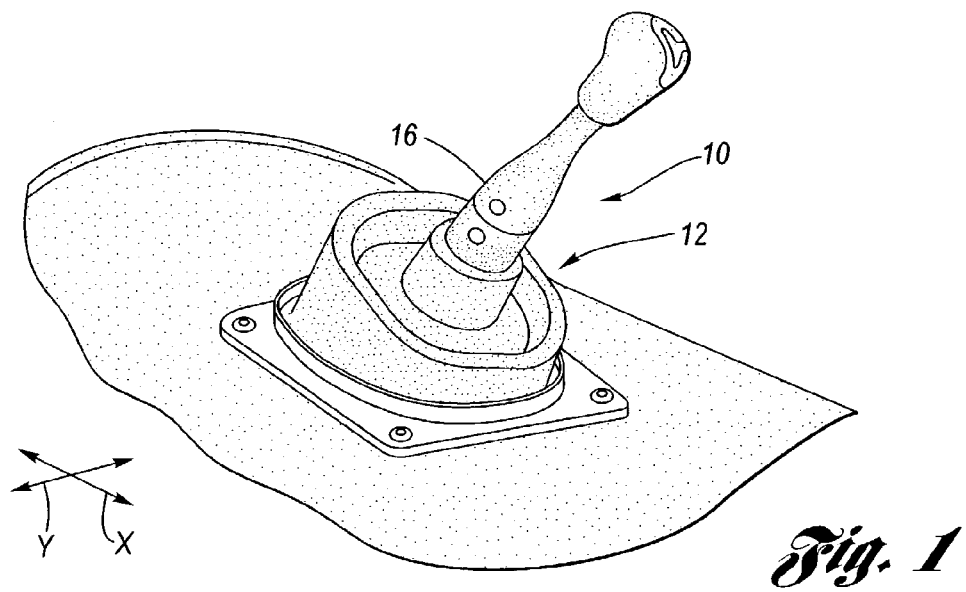
*Fig. 1*
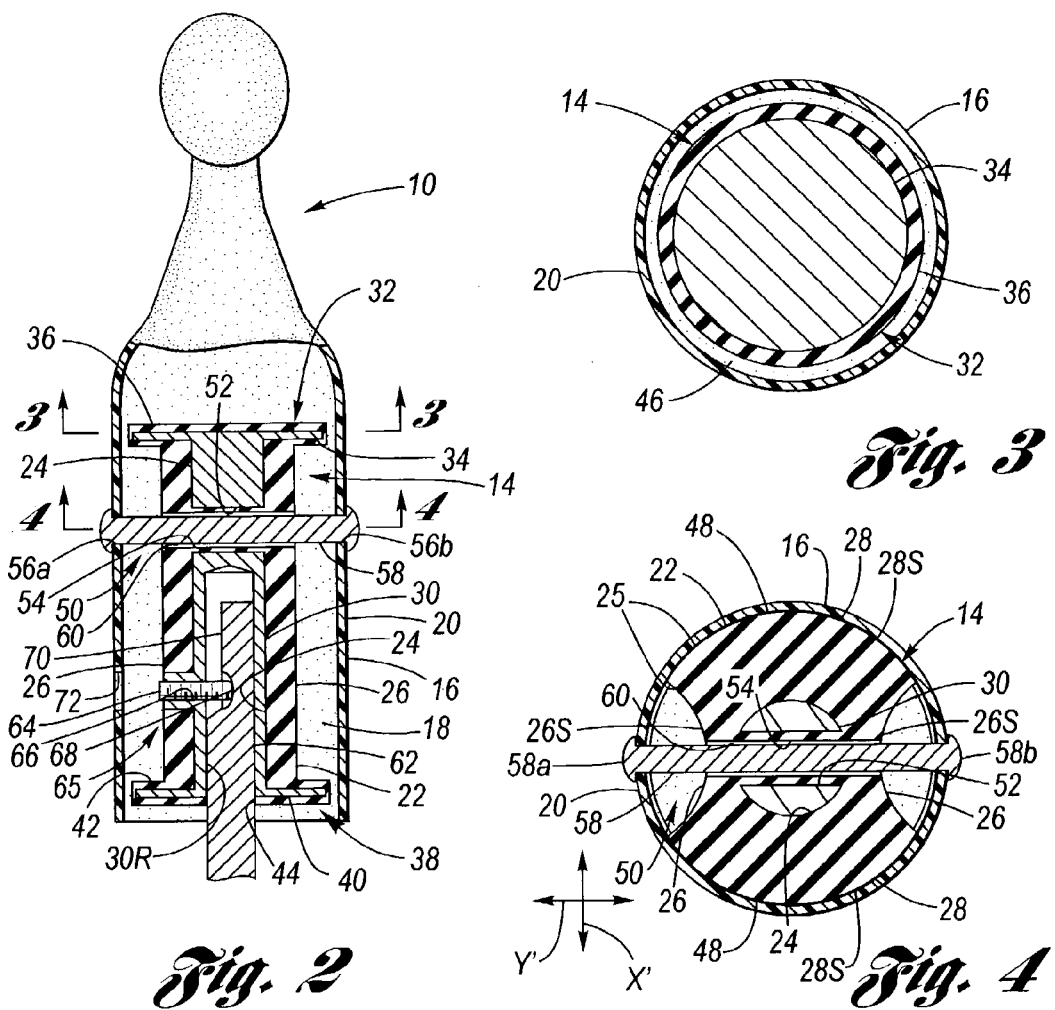
*Fig. 2*  *Fig. 3*  *Fig. 4*

MECHANICAL ATTACHMENT FOR A SHIFT LEVER VIBRATION ISOLATOR

TECHNICAL FIELD

The present invention relates to automotive shift levers, and more particularly to a shift lever vibration isolator. More particularly, the present invention relates to a shift lever vibration isolator featuring two-stage vibration isolation with bi-directional vibration isolation characteristics. Still more particularly, the present invention relates to a mechanical attachment for a shift lever vibration isolator relative to the shift lever.

BACKGROUND OF THE INVENTION

Shift levers are used in motor vehicles to achieve gear ratio changes of the transmission. For example, in a typical manual transmission automobile, a diver who is initially at a stop may accelerate to cruise speed may shift through four gear ratios, commonly referred to as "gears" (ie., first, second, third and fourth gear); this driver has also available, besides these forward gears, a reverse gear.

In that the shift lever is hand held and connected to a drive component of the vehicle, vibration from an operating engine is mechanically conducted to the shift lever, and ultimately to the hand of the driver. The idle frequency of a four cylinder engine is typically greater than 23 Hz. As the number of cylinders increases, the idle frequency will increase. Of this vibration, the lateral (that is, cross-car or side-to-side) vibration mode is the most important contribution. While the longitudinal (that is, fore-aft) vibration contribution is not very important, a subjective stiff feel of the shift lever in the driver's hand is most important in the longitudinal direction.

A shift lever can be regarded as a driven harmonic oscillator, wherein the engine vibration causes the driving. The natural vibration frequency of a shift lever in relation to the vibration frequency of an engine determines whether resonance will occur. The degree to which this can be avoided is referred to as vibration isolation. For best vibration isolation, a shift lever should have a natural vibration frequency, $v_S$, of:

$$v_S < v_E / \sqrt{2},$$

wherein $v_E$ is the vibration frequency of the engine when operating at idle. For example, if the engine has a 23 Hz vibration frequency, the shift lever should be isolated by its natural vibration frequency being less than about 16 Hz.

Prior art shift lever vibration isolators merely utilize an aluminum housing covered with rubber. The housing threadably attaches to a transmission shift and the isolator fits into a sleeve of the shift lever. Problematically, however, even though the rubber may provide damping of the amplitude of vibration, vibration isolation because of minimization of the natural vibration frequency (such as by a soft rubber interface) is contrary to the need for a subjective stiff feel (such as for example by a hard rubber interface).

Accordingly, what remains needed in the art is a shift lever vibration isolator which does not trade off minimization of the natural vibration frequency for a subjective stiff feel, and vice versa.

SUMMARY OF THE INVENTION

The present invention is a mechanical attachment for two-stage, bi-directional shift lever vibration isolator which does not trade off minimization of natural vibration frequency for a subjective stiff feel, and vice versa.

The shift lever has a lower end sleeve forming a cavity defined by a sleeve sidewall. The shift lever vibration isolator includes a damping body composed of a resilient, vibration amplitude damping material, the damping body having an axial bore and an external surface characterized by a pair of mutually diametrically opposed recessed surfaces and a pair of mutually diametrically opposed outer surfaces in perpendicular relation to the recessed surfaces; an attachment housing located in the bore provides an attachment location for a shift shaft of a transmission; an upper washer connected to the housing and abutting an upper end of the damping body; and a lower washer connected to the housing and abutting a lower end of the damping body. The upper and lower washers are composed of, respectively, rigid upper and lower disks covered by a covering of a resilient, vibration amplitude damping material, as for example natural rubber.

Preferably, the housing is integrally connected with the upper and lower disks, wherein the preferred material thereof is metal. Also preferably, the resilient, vibration amplitude damping material is formed over the housing and the upper and lower disks to thereby provide an integral connection between the damping body and the upper and lower disk coverings. It is preferred for the outer surfaces to be convex surfaces and the recessed surfaces to be concave surfaces, collectively providing an hour-glass cross-section of the damping body composed of the outer surface and recessed surfaces.

The shift lever vibration isolator is received into the cavity, wherein the outer (convex) surfaces of the damping body are in abutting relation to the sidewall in a longitudinal axis of operation of the shift lever, and wherein the upper and lower washers are sized to fit within the sidewall with a predetermined perimeter separation (clearance) with respect to the sidewall.

In order to attach the shift lever vibration isolator to the shift lever, the attachment housing is provided with an attachment bore which is overmolded by a bore lining layer of the material of the damping body. The attachment bore is parallel to a lateral axis which is perpendicular to the longitudinal axis, and is centrally disposed with respect to the recessed surfaces. Additionally, the sleeve of the shift lever has a pair of diametrically opposed attachment holes which are aligned with the attachment bore when the shift lever isolator is received in the cavity. An attachment pin is then passed through the attachment holes and attachment bore and then affixed, as for example by an orbital riveting operation at its opposed ends. There is a clearance between the attachment pin and the bore lining layer, and no clearance of the attachment pin at the attachment holes.

The hour-glass cross-section of the damping body provides high stiffness and high natural vibration frequency of the shift lever in the longitudinal axis and low stiffness and low natural vibration frequency of the shift lever in a lateral axis, which is perpendicular to the longitudinal axis. The perimeter clearance of the washers determines when, under hand force applied to the shift lever, the damping body has undergone sufficient shear force that one or both of the upper and lower washers contact the sidewall. When washer contact occurs, stiffness in the direction of the applied force is very high.

Accordingly, three aspects are achieved in combination of the shift lever vibration isolator and its mechanical attachment to the shift lever.

The first aspect is a two-stage stiffness, wherein the first stage stiffness occurs by free (that is by an unattached) contact between the convex surfaces of the damping body and the sidewall and the second stage occurs by free contact between one or both of the upper and lower washers and the sidewall.

The second aspect is bi-directionality of the stiffness provided by the hour-glass cross-section of the damping member, wherein, at the first stage, high longitudinal stiffness and low lateral stiffness are provided. The low lateral stiffness provides excellent vibration isolation in the lateral axis because the natural frequency of vibration of the shift lever in the lateral axis is tuned to be below the engine vibration frequency (at idle) divided by the square root of two.

The third aspect resides in the mechanical attachment of the shift lever vibration isolator relative to the sleeve of the shift lever, wherein vibration isolation is further achieved by the shift lever vibration isolator being freely slidable on the attachment pin, facilitated by the clearance between the attachment pin and the bore lining layer, along the axis of vibration excitation.

The combination of these three aspects provide an independence between vibration isolation and stiff hand feel of the shift lever. This independence can be adjusted (tuned) to particular vehicles and shift levers by (mainly) adjustment of any or all of: 1) the dimensions of the damping body (particularly length and hour-glass cross-section), 2) the hardness of the material of the damping body, 3) the perimeter separation of the washers, 4) the material and depth of the covering of the washers, and 5) the clearance of between the pin and the bore lining layer. As a result, the driver feels little vibration coming from the shift lever, yet also feels a stiff, satisfying control of the shift lever.

Accordingly, it is an object of the present invention to provide a vibration isolator for a shift lever which provides a two-stage, bi-directional isolation of engine vibration.

This and additional objects, features and advantages of the present invention will become clearer from the following specification of a preferred embodiment.

BRIEF DESCRIPTION OF THE DRAWINGS

FIG. 1 is a perspective view of a shift lever equipped with the shift lever vibration isolator according to the present invention, shown in a typical environment of operation.

FIG. 2 is a partly sectional side view of the shift lever equipped with the shift lever vibration isolator according to the present invention.

FIG. 3 is a partly sectional view, seen along line 3—3 of FIG. 2.

FIG. 4 is a partly sectional view, seen along line 4—4 of FIG. 2.

DESCRIPTION OF THE PREFERRED EMBODIMENT

Figure 5:
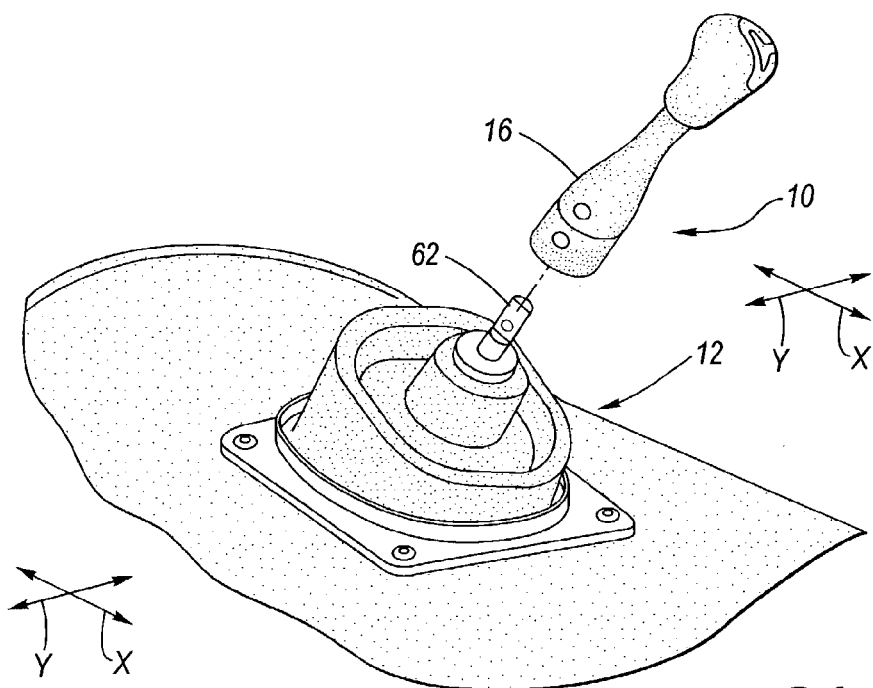
FIG. 5 is a perspective, exploded view of a shift shaft and a shift lever equipped with the shift lever vibration isolator according to the present invention.

Referring now to the Drawing, FIG. 1 depicts a shift lever 10 in a typical environment of operation, located at a floor mounted console 12 of a motor vehicle. The driver grasps the shift lever 10 and moves it in a lateral vehicle axis Y to find a gear, then moves the shift lever in a longitudinal vehicle axis X (oriented perpendicular to the lateral vehicle axis) to actually select the gear. In that the movement of the shift lever 10 in the longitudinal vehicle axis X involves application thereto of a resolute force by the driver to select the gear in opposition to a reaction force from the transmission, this direction of movement of the shift lever must have a firm feel, whereas the movement of the shift lever in the lateral vehicle axis Y, need not have a firm feel. Further, in view that the vibration from an operating engine which is mechanically conducted to the shift lever 10 has its major component in the lateral vehicle axis Y, and minor component in the longitudinal vehicle axis X, need for vibration isolation is greatest in the lateral vehicle axis Y. This is particularly true for a light truck having a longitudinally (fore-aft) mounted engine. In this regard, it will be noted that the shift lever 10 has a longitudinal lever axis X' parallel to the longitudinal vehicle axis X, and a lateral lever axis Y' parallel to the lateral vehicle axis Y.

Taking these aspects into careful consideration, a shift lever vibration isolator 14 is provided (see FIGS. 2, 3, 4 and 6) within a sleeve 16 of the shift lever 10. In this regard, the sleeve 16 is located at a lower end of the shift lever 10, and forms therewithin a cavity 18 defined by a sleeve sidewall 20.

The shift lever vibration isolator 14 includes a damping body 22 composed of a resilient, vibration amplitude damping material, as for example an elastomer, such as natural rubber. As best shown at FIG. 4, the damping body 22 has an axial bore 24 and an external surface 25 featuring a pair of mutually diametrically opposed recessed surfaces 26 and a pair or mutually diametrically opposed outer surfaces 28 located in perpendicular relation to the recessed surfaces. Preferably, in the recessed surfaces are concave surfaces 26S and the outer surfaces 28 are convex surfaces 28S, collectively forming an hour-glass cross-section of the damping body 22.

The shift lever vibration isolator 14 also includes an attachment housing 30 in the form of a partly hollow cylinder having a cylindrical shift shaft receptacle 3 OR at a lower end thereof. The preferred material of the attachment housing is metal. The attachment housing is coextensive with the length of the axial bore 24.

The shift lever vibration isolator 14 further includes an upper washer 32 composed of an upper disk 34 having a covering 36 of a resilient, vibration amplitude damping material (as for example natural rubber), and a lower washer 38 composed of an lower disk 40 also having a covering 42 also of the resilient, vibration amplitude damping material. The upper and lower disks 34, 40 are rigidly connected to respective upper and lower ends of the attachment housing 28, wherein the lower washer 38 has a central hole 44 concentrically coextensive with respect to the axial bore 24 and the cylindrical shift shaft receptacle 30R.

The preferred mode of fabrication is to form a piece of metal stock, then machine it to provide, as a single piece of metal, the attachment housing 28 and upper and lower disks 34, 40 at either end of the housing. Thereafter, a resilient, vibration amplitude damping material, as for example natural rubber, is formed thereover as a single piece including the damping body 22 and the coverings 36, 42.

Figure 6:
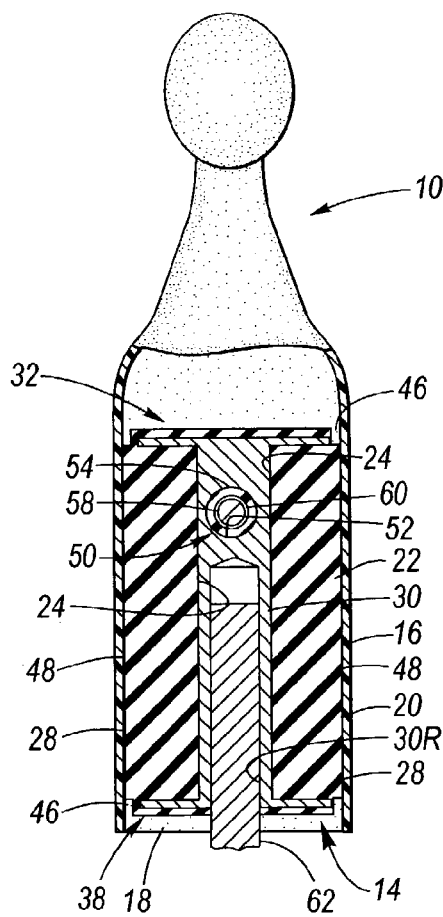
FIG. 6 is a partly sectional side view of the shift lever equipped with the shift lever vibration isolator according to the present invention, shown threadably interfaced with a shift shaft of a transmission.

The shift lever vibration isolator 14 is received into the cavity 18, wherein the convex surfaces 28S of the damping body 22 abut the sleeve sidewall 20 and the perimeters of the upper and lower washers 32, 38 are sized to fit within the sleeve sidewall with a predetermined perimeter separation (clearance) 46 with respect to the sidewall, as shown at FIGS. 3 and 6. The convex surfaces 28S freely abut the sleeve sidewall 20.

The shift lever vibration isolator 14 is attached to the shift lever 10 via a mechanical attachment 50. In this regard, the attachment housing 30 is provided with an attachment bore 52 which, as best shown at FIGS. 2 and 4) is oriented parallel to the lateral lever axis Y', and is also centrally disposed with respect to the recessed surfaces 26. The attachment bore 52 is overmolded by a bore lining layer 54 of the material of the damping body 22, (with which it is an integral part). The sleeve 16 at the lower end of the shift lever 10 has a pair of diametrically opposed attachment holes 56a, 56b which are aligned with the attachment bore 52 when the shift lever isolator 14 is received in the cavity 18 of the sleeve. An attachment pin 58 is then passed through the attachment holes 56a, 56b and the attachment bore 52 and then affixed, as for example by providing interfering heads 58a by an orbital riveting operation at its opposed ends. There is a clearance 60 between the attachment pin 58 and the bore lining layer 54 to allow sliding (slipping) therebetween, and no clearance of the attachment pin at the attachment holes 56a, 56b. In this regard, the shift lever vibration isolator 14 is held in non-rotatable relation within the sleeve 18, yet the shift lever vibration isolator is free of a hard and fast attachment to the shift lever (as would occur for example if the convex surfaces were to be adheringly attached to the sleeve).

The shift lever 10 is then engaged by a shift shaft attachment 65 with a shift shaft 62 of the transmission of the motor vehicle (see FIGS. 2, 5 and 6). Proper function of the shift lever 10 requires that the longitudinal lever axis X' of the shift lever is parallel with the longitudinal vehicle axis X of the motor vehicle, and that the lateral lever axis Y' of the shift lever is parallel to the lateral vehicle axis Y of the motor vehicle. Proper adjustment of orientation of the shift lever axes relative to the vehicle axes is achieved by the shift shaft attachment 65. The shift lever attachment 65 may be, for example, in the form of a threaded engagement or, more preferably, in the form of a set-screw 64 threading through a threaded hole 66 of the attachment housing 30 and abutting a dimple 68 at a flat 70 of the shift shaft, wherein the sleeve 16 has an access opening 72 for allowing driving the set-screw.

The orientations of the convex and concave surfaces 28S, 26S are critical within the sleeve 16, wherein the convex surfaces are centered on the longitudinal lever axis X' of the shift lever 10 and the concave surfaces are centered on the lateral lever axis Y' of the shift lever, such that when the shift lever 10 is installed (as per FIGS. 1, 4 and 5) the longitudinal vehicle axis X is parallel to the longitudinal lever axis X' and the lateral vehicle axis Y is parallel to the lateral lever axis Y'. The orientation of the damping body 22 is critical to operation because the convex surfaces of the hour-glass cross-section of the damping body provide high stiffness in the longitudinal lever axis X', and the concave surfaces of the hour-glass cross-section provide low stiffness and excellent vibration isolation in the lateral lever axis Y'.

The perimeter separation (clearance) 46 of the perimeter of the upper and lower washers 32, 38 determines when, under hand applied force to the shift lever 10, the damping body 22 has undergone sufficient resilient compression and shear force, due to an opposing reactive force of the transmission shift shaft 62 at the attachment housing 30, that one or both of the upper and lower washers contact the sleeve sidewall 20. Thus, below a predetermined level of hand force applied by the driver upon the shift lever 10, the driver feels stiffness related to the resilient stiffness between the convex surfaces 28S and the attachment housing 28. But, above the predetermined level of hand force, one or more of the washers contact with the sleeve sidewall occurs, and stiffness in the direction of the applied force is thereupon and thereafter very high.

Figure 7:
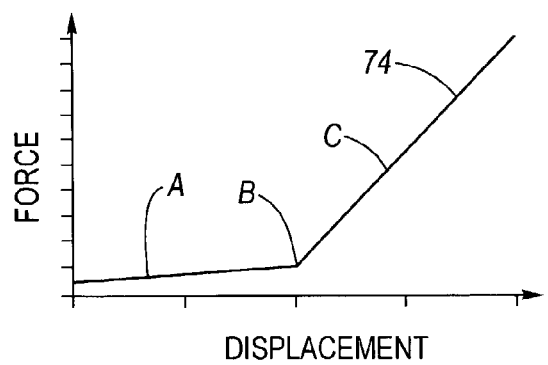
FIG. 7 is a plot of stiffness force versus displacement of the shift lever vibration isolator relative to the sleeve of a shift lever in a longitudinal direction.

FIG. 7 depicts the two-stage aspect of operation of the shift lever vibration isolator 14. Shown is a plot 74 of stiffness versus shear displacement of the shift lever vibration isolator 14 relative to the sleeve sidewall. In zone A of the plot 74, the stiffness is related to the resiliency of the damping body 22, wherein the upper and lower washers do not contact the sleeve sidewall. At location B, at least one of the upper and lower washers has made contact with the sleeve sidewall. In zone C, stiffness is considerably higher than in zone A, and further applications of force by the driver to the shift lever result in smaller displacements, as compared to the force-displacement relationship of zone A.

With regard to the bi-directional aspect of operation of the shift lever vibration isolator 14, the recessed surfaces lower the natural vibration frequency of the shift lever in the lateral lever axis Y' on which they are centered, thereby isolating vibration in the lateral lever axis. This level of vibration isolation is not provided in the longitudinal lever axis, as there are no recessed surfaces centered on the longitudinal lever axis.

The vibration isolation in the lateral lever axis Y' is best if the shift lever (including the shift lever vibration isolator) has a natural vibration frequency, $\upsilon_S$, of:

$$\upsilon_S < \upsilon_E/\sqrt{2},$$

wherein $\upsilon_E$ is the vibration frequency of the engine when operating at idle. For example, a shift lever vibration isolator 14 according to the present invention can reduce a 23 Hz engine idle vibration frequency, $\upsilon_E$, to a shift lever (with the shift lever vibration isolator) vibration frequency, $\upsilon_S$, of 13 Hz, well below $\upsilon_E/\sqrt{2}$, which is 16.23 Hz.

Accordingly, the shift lever vibration isolator 14, in association with its mechanical attachment afforded by the mechanical attachment 50, features three aspects which allow the driver to feel little vibration coming from the shift lever, yet also feel a stiff, satisfying control of the shift lever. The combination of these two aspects provide an independence between vibration isolation and stiff hand feel of the shift lever.

The first aspect is a two-stage stiffness, wherein the first stage stiffness (zone A in FIG. 7) occurs by a free (that is, an unattached) contact between the convex surfaces of the damping body and the sidewall and the second stage stiffness (zone C of FIG. 7) occurs by free contact between one or both of the upper and lower washers and the sleeve sidewall.

The second aspect is bi-directionality of the vibration isolation (stiffness) provided by the recessed surfaces 26 in combination with the outer surfaces 28, which, preferably, collectively form an hour-glass cross-section of the damping member, facilitated by an ability of the shift lever vibration isolator 14 to freely slide (further facilitated by the clearance 60) on the attachment pin 58. Since the damping body is thicker in the longitudinal lever axis, and thinner in the lateral lever axis, at the first stage (zone A of FIG. 7), in the lateral lever axis, vibration isolation is high because the natural frequency of vibration of the shift lever is low due to low stiffness, and in the longitudinal lever axis, stiffness is high (and, as a consequence, the natural frequency of vibration is higher than that in the lateral lever axis).

The third aspect is the vibration isolation afforded by mechanical attachment 50. In this regard, the clearance 60 between the bore lining layer 54 and the attachment pin 58 allows the shift lever vibration isolator 14 to be freely slidable on the attachment pin along the axis of vibration excitation Y, Y', yet, in combination with the aforementioned shift shaft attachment 65, retains the shift lever 10 properly seated and oriented on the shift shaft 62.

The vibration isolation (stiffness) and the vibration amplitude damping along each of the longitude lever axis X' and lateral lever axis Y' can be adjusted (tuned) to particular vehicles and shift levers by adjustment. mainly, of any or all of the following criteria.

The dimensions of the damping body may be changed. For example, a longer length in relation to diameter can result in less stiffness for a given resiliency of the resilient, vibration amplitude absorbing material. And, for another example, the size of the recessed surfaces may be changed (in terms of depth and/or area). In this regard, as the recessed surfaces become smaller, the bi-directionality of the stiffness and vibration isolation tends to be lost, whereas by increasing the size recessed surfaces, the bi-directionality is increased.

The hardness of the material of the damping body 22 can be changed. A harder (less resilient) material would provide a stiffer feel.

The perimeter separation of the washers with respect to the sidewall can be adjusted. A larger separation allows for a larger zone A in FIG. 7.

The material and depth of the covering of the washers can be changed. Greater resiliency of the washers at the sidewall changes the singularity at point B of FIG. 7 into a localized zone transitioning between the slopes of zones A and C.

The clearance 60 between the bore lining layer 54 and the attachment pin 58 may be changed to make more or less free the slip therebetween.

To those skilled in the art to which this invention appertains, the above described preferred embodiment may be subject to change or modification. For example, the shift lever vibration isolator 14 is applicable to either a manual or automatic transmission. Such change or modification can be carried out without departing from the scope of the invention, which is intended to be limited only by the scope of the appended claims.

The invention claimed is:

1. A shift lever and shift lever vibration isolator combination comprising:

a shift lever having a sleeve, said sleeve having a sleeve sidewall defining a cavity, said shift lever having a longitudinal axis and a lateral axis that is perpendicular to said longitudinal axis;

a shift lever vibration isolator located within said sleeve; and a mechanical attachment of said shift lever vibration isolator with respect to said sleeve, said mechanical attachment comprising:

said shift lever vibration isolator having a laterally disposed attachment bore;

said sleeve having a pair of diametrically opposed holes formed therein; and an attachment pin passing through said attachment bore and said holes in said sleeve;

wherein said shift lever vibration isolator provides a first stiffness in said longitudinal axis and a second stiffness in said lateral axis, wherein said first stiffness is greater than said second stiffness; and wherein said shift lever vibration isolator provides a first natural frequency of vibration of the shift lever in said longitudinal axis and a second natural frequency of vibration of the shift lever in said lateral axis, wherein said first natural frequency of vibration is higher than said second natural frequency of vibration.

2. The combination of claim 1, wherein said shift lever vibration isolator comprises:

a damping body composed of a resilient, vibration amplitude damping material, said damping body having an upper end, a lower end and an external surface defined by a pair of mutually diametrically opposed outer surfaces and, in perpendicular relation thereto, a pair of mutually diametrically opposed recessed surfaces;

a rigid attachment housing located at an axial center of said damping body, said attachment housing having an upper end and an opposite lower end;

an upper washer abutting said upper end of said damping body, said upper washer comprising a rigid upper disk attached to said upper end of said attachment housing and a resilient, vibration amplitude damping material first covering which covers said upper washer; and a lower washer abutting said lower end of said damping body, said lower washer comprising a rigid lower disk attached to said upper end of said attachment housing and a resilient, vibration amplitude damping material second covering which covers said lower washer;

wherein said shift lever vibration isolator is located within said cavity of said sleeve such that said outer surfaces freely abut said sidewall in central alignment with respect to said longitudinal axis, and wherein said upper and lower washers each have a respective perimeter which is separated from said sleeve sidewall; and wherein said mechanical attachment further comprises said attachment bore being formed in said attachment housing in centrally disposed relation to said mutually diametrically opposed recessed surfaces, wherein a bore lining layer of said damping body lines said attachment bore.

3. The combination of claim 2, wherein said attachment pin is separated from said bore lining layer by a clearance.

4. The combination of claim 3, wherein said outer surfaces comprise convex surfaces, and wherein said recessed surfaces comprise concave surfaces, said convex and concave surfaces collectively forming an hour-glass cross-section of said damping body.

5. The combination of claim 4, wherein said attachment housing, said upper disk and said lower disk are mutually integrally connected together.

6. The combination of claim 5, wherein said damping body, said first cover and said second cover are mutually integrally connected together.

7. The combination of claim 6, wherein said separation is preselected to provide contact between at least one of said upper and lower washers in response to a predetermined application force applied to said shift lever and a predetermined opposing reaction force applied to said attachment housing.

8. A motor vehicle having a longitudinal vehicle axis and a lateral vehicle axis perpendicular to said longitudinal vehicle axis, comprising:
- an engine having a predetermined idle frequency in said lateral vehicle axis;
- a transmission drivingly connected to said engine, said transmission having a plurality of gear positions selected by movement of a shift shaft connected to said transmission;
- a shift lever having a sleeve, said sleeve having a sleeve sidewall defining a cavity, said shift lever having a longitudinal lever axis and a lateral lever axis that is perpendicular to said longitudinal lever axis;
- a shift lever vibration isolator located within said sleeve and connected to said shift shaft; and
- a mechanical attachment of said shift lever vibration isolator with respect to said sleeve, said mechanical attachment comprising:
  - said shift lever vibration isolator having a laterally disposed attachment bore parallel to said lateral lever axis;
  - said sleeve having a pair of diametrically opposed holes formed therein; and
  - an attachment pin passing through said attachment bore and said holes in said sleeve;
- wherein said shift lever vibration isolator provides a first stiffness in said longitudinal axis and a second stiffness in said lateral axis, wherein said first stiffness is greater than said second stiffness; and
- wherein said shift lever vibration isolator provides a first natural frequency of vibration of said shift lever in said longitudinal axis and a second natural frequency of vibration of said shift lever in said lateral axis, wherein said first natural frequency of vibration is higher than said second natural frequency of vibration.

9. The motor vehicle of claim 8, wherein said second natural frequency of vibration of said shift lever is less than the idle frequency divided by the square root of two.

10. The motor vehicle of claim 8, wherein said shift lever vibration isolator comprises:
- a damping body composed of a resilient, vibration amplitude damping material, said damping body having an upper end, a lower end and an external surface defined by a pair of mutually diametrically opposed outer surfaces and, in perpendicular relation thereto, a pair of mutually diametrically opposed recessed surfaces;
- a rigid attachment housing located at an axial center of said damping body, said attachment housing having an upper end and an opposite lower end, said attachment housing being connected to said shift shaft, wherein said longitudinal vehicle axis is substantially parallel to said longitudinal axis and said lateral vehicle axis is substantially parallel to said lateral lever axis;
- an upper washer abutting said upper end of said damping body, said upper washer comprising a rigid upper disk attached to said upper end of said attachment housing and a resilient, vibration amplitude damping material first covering which covers said upper washer; and
- a lower washer abutting said lower end of said damping body, said lower washer comprising a rigid lower disk attached to said upper end of said attachment housing and a resilient, vibration amplitude damping material second covering which covers said lower washer;
- wherein said outer surfaces freely abut said sidewall in central alignment with respect to said longitudinal lever axis, and wherein said upper and lower washers each have a respective perimeter which is separated from said sleeve sidewall; and
- wherein said mechanical attachment further comprises said attachment bore being formed in said attachment housing in centrally disposed relation to said mutually diametrically opposed recessed surfaces, wherein a bore lining layer of said damping body lines said attachment bore.

11. The combination of claim 10, wherein said attachment pin is separated from said bore lining layer by a clearance.

12. The motor vehicle of claim 11, wherein said outer surfaces comprise convex surfaces, and wherein said recessed surfaces comprise concave surfaces, said convex and concave surfaces collectively forming an hour-glass cross-section of said damping body.

13. The motor vehicle of claim 12, wherein said attachment housing, said upper disk and said lower disk are mutually integrally connected together.

14. The motor vehicle of claim 13, wherein said damping body, said first cover and said second cover are mutually integrally connected together.

15. The motor vehicle of claim 14, wherein said separation is preselected to provide contact between at least one of said upper and lower washers in response to a predetermined application force applied to said shift lever and a predetermined opposing reaction force applied to said attachment housing by said shift shaft.

16. The motor vehicle of claim 15, wherein said second natural frequency of vibration of said shift lever is less than the idle frequency divided by the square root of two.

* * * * *